Feb. 13, 1934.  M. H. MARTIN  1,946,538
CAR TRUCK
Original Filed Nov. 4, 1929
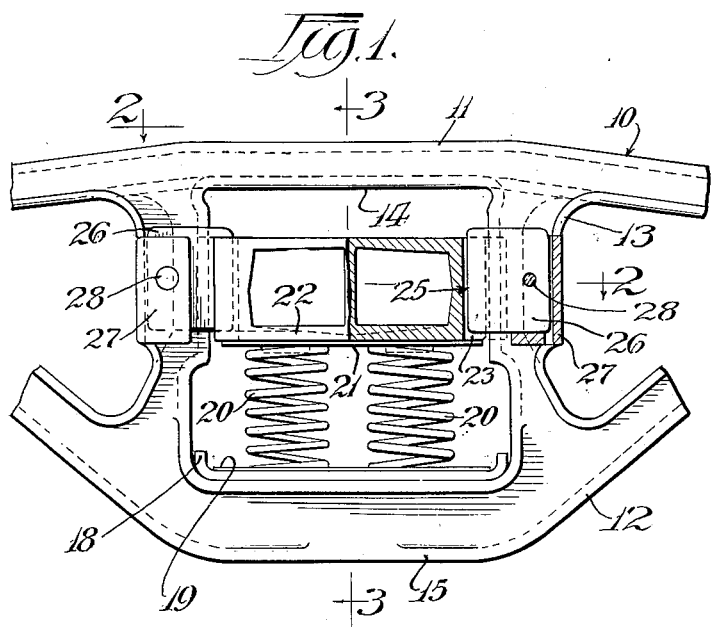
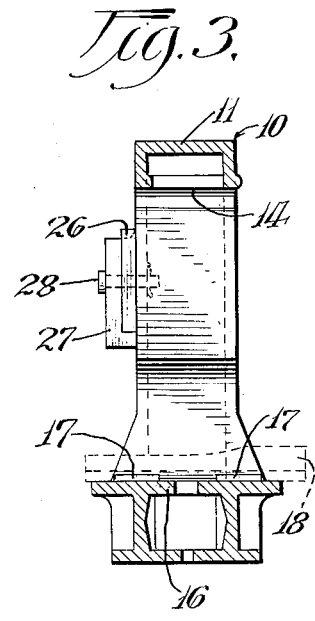
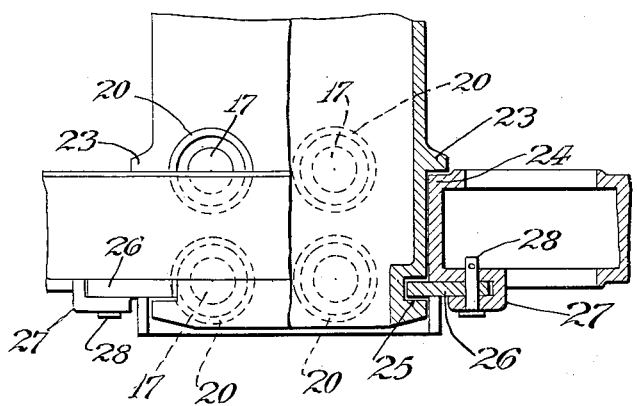
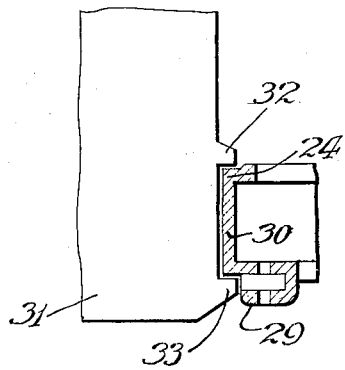
Inventor:
Mark H. Martin
By Rector, Hibben, Davis & Macauley
Attorneys Patented Feb. 13, 1934

1,946,538

UNITED STATES PATENT OFFICE 1,946,538

CAR TRUCK

Mark H. Martin, Reading, Pa., assignor to Birdsboro Steel Foundry & Machine Company, Birdsboro, Pa., a corporation of Pennsylvania Original application November 4, 1929, Serial No. 404,592. Divided and this application October 2, 1931. Serial No. 566,497

6 Claims. (Cl. 105—207)

My invention relates to car trucks and more particularly to an improved arrangement for connecting the side frame and truck bolster that greatly facilitates their assembly and disassembly.

One object of my invention is to devise an inter-connection between the bolster and side frame which is arranged to facilitate the disassembly of these parts for replacing the wheels or the frame and which further does not require the removal of the springs, spring planks, or the bolster.

A further object is to provide a connection of the character indicated which does not require such a modification of the side frame as to interfere with the association of a standard form of truck bolster therewith, so that the side frame of the present application is entirely interchangeable with side frames of the standard type.

As stated above, the manner of engaging the end of the truck bolster with the frame has been designed for the purpose of facilitating the assembly and dismantling of these parts in conjunction with the springs and spring plank. With the standard A. R. A. truck bolster or any bolster with integral guide lugs, the replacement of a pair of wheels or side frame requires a removal of the springs and spring plank and a dropping of the bolster to the bottom of the window opening of the side frame. In my improved arrangement, which substitutes removable retaining plates carried by the frame and engaging with the bolster for the customary outer integral lugs on the bolster, it is only necessary to first remove these plates and then block up the spring plank, springs and bolster in order to remove the frame. These plates perform the primary function of the lugs as regards vertical guidance of the bolster and preventing outward lateral movement of the side frame in case of a wreck or other unusual operative conditions, and the carriage of the plates on the frame has been so arranged as to permit the use of a bolster having integral lugs, if substitution is desired. My construction is therefore characterized by the important feature of interchangeability with existing parts which is a primary requisite in railroad operation.

The present application is a division of my copending application for car truck, Serial No. 404,592, filed November 4, 1929.

These and further objects of my invention will be set forth in the following specification, reference being had to the accompanying drawing and the novel means by which said objects are effectuated will be definitely pointed out in the claims.

In the drawing:

Figure 1 is a side elevation of a portion of a car truck, partly in section, the journal boxes and wheels being omitted.

Fig. 2 is a section along the line 2—2 in Fig. 1, looking in the direction of the arrows, and showing the manner of engaging the truck bolster and side frame.

Fig. 3 is a section along the line 3—3 in Fig. 1, looking in the direction of the arrows, the bolster and frame being omitted and the adjacent end of the spring plank being shown in dotted outline.

Fig. 4 is a view similar to Fig. 2 showing the application of a standard truck bolster to my improved side frame.

The several views on the drawing illustrate portions of a car truck comprising a side frame 10 which, as illustrated, is of cast construction, but may be otherwise formed as desired without departing from the essential conception of the present invention. The frame 10 consists of the usual compression member 11 and tension member 12 which are joined by the usual bolster columns 13 disposed in spaced relation to define with said members a window opening 14 and a portion of the tension member 12 below said columns comprising a bottom tie member 15.

The tie member is generally of box section and the upper web 16 thereof is formed with the usual bosses 17 which project upwardly therefrom and are received in suitable holes provided in a spring plank 18 which rests on said web and is determined in position by said bosses. The spring plank in turn supports a spring plate 19 upon which rest the customary helical springs 20. A spring cap 21 is carried on the springs 20 and in turn supports one end of a bolster 22.

Except for the specific changes in the frame 10 and the bolster 22, as hereinafter described, the foregoing parts in and of themselves form no part of the present invention, but may be of any of the types now current in standard practice.

At a predetermined distance inwardly from each end, the bolster 22 is provided with the usual integral lugs 23 which coact with the shoulders 24 formed on the inside of the side frame 10. A channel-shaped depression 25 is formed along each vertical side of the bolster, adjacent the ends thereof, and each of which receives, when the bolster is in operative position, one end of a retaining plate 26 which is carried in a pocket 27 provided on the side frame 10 and prevented from disengaging therefrom by means of a pin 28 which passes through said plate and the walls of said pocket. As will be noted by reference to Fig. 2, the extreme width of the bolster 22 outwardly from the integral lugs 23 is less than the width of the window opening 14, so that in order to remove the side frame 10, it is merely necessary to jack up the spring plank, spring assembly and the bolster, thereby removing the load from the side frame, whereupon the retaining plates 26 may be abstracted and the side frame removed. According to present methods, wherein a standard bolster is used which embodies as a substitute for the retaining plates 26 other integral lugs similar to the lugs 23, it is necessary to entirely remove the spring assembly and spring planks in order to permit the dropping of the truck bolster to the bottom of the window opening before the side frame can be removed. The simplicity and practical advantages of the above arrangement will therefore be apparent, the use of the retaining plates 26 not sacrificing any operating advantage which may now reside in the integral lugs, since the plates adequately guide the bolster in vertical movement, prevent outward lateral movement of the side frame, as well as tying these parts of the truck together in the event of a wreck or abnormal operating condition.

However, the use of the plates 26 does not prevent the side frame 10 from being assembled in connection with a standard bolster, as will be seen by reference to Fig. 4. The end face of the outer side wall 29 of the pocket 27 is stepped back from the sides of the window opening 14 sufficiently to establish a shoulder 30 whose lateral distance from the shoulder 24 is such as to accommodate a standard bolster 31 having the integral lugs 32 and 33, the shoulder 30 being operatively positioned with reference to the lug 33.

It is also contemplated that the above method of attaching the bolster and side frame may be slightly modified for trucks employing the so-called lateral motion bolster, merely by eliminating the lugs 23 and increasing the width of the depressions 25. Under these conditions, the plates 26 would limit endwise movement of the bolster in both directions.

While I have shown one set of elements and combinations thereof for effectuating my improved car truck, it will be understood that the same is intended for purpose of illustration only and in no wise to restrict my arrangement to the exact forms and structures shown, for many changes may be made therein without departing from the spirit of my invention.

I claim:

1. In a car truck, the combination of a side frame including a window opening and pockets facing each other adjacent the opposite sides of said opening, said pockets being stepped back from the adjacent edges of said opening to provide shoulders for engaging the lugs of a standard bolster, a bolster engageable with said frame through said opening and including depressions facing outwardly from opposite sides thereof on the outer end in complementary relation to the side frame pockets, and means insertable in said pockets and depressions for limiting endwise movement of the bolster, the end width of said bolster being less than the width of said opening.

2. A side frame including a window opening and having pockets facing each other adjacent the opposite sides of said opening, said pockets being provided for the reception of means engageable with a bolster insertable through said opening for limiting endwise movement of the bolster, and said pockets being stepped back from the adjacent edges of said opening to provide shoulders for engaging the lugs of a standard bolster.

3. A side frame including a window opening and having pockets on the outside thereof facing each other adjacent the opposite sides of said opening, said pockets being provided for the reception of means engageable with a bolster insertable through said opening for limiting endwise movement of the bolster, and said pockets being stepped back from the adjacent edges of said opening to provide shoulders for engaging the lugs of a standard bolster.

4. A side frame including a window opening whose upper width is narrower than its lower width and having pockets on the outside thereof facing each other adjacent the opposite sides of said opening, said pockets being provided for the reception of means engageable with a bolster insertable through said opening for limiting endwise movement of the bolster, and said pockets being stepped back from the edges bounding the narrow width portion of said opening to provide shoulders for engaging the lugs of a standard bolster.

5. In a car truck, the combination of a side frame including a window opening, a bolster engageable with said frame through said opening, and interengaging means on said bolster and frame coacting to limit endwise movement of the bolster, a portion of said bolster interengaging means being located on opposite sides of said window opening and being stepped back from the adjacent edges thereof to provide shoulders for engaging the lugs of a standard bolster.

6. A side frame including a window opening and having devices on the outside thereof forming a part of means for engaging a bolster extending through the opening to limit endwise movement thereof, said devices being spaced from the adjacent edges of the opening to provide shoulders for engaging the lugs of a standard bolster.

MARK H. MARTIN.